US007967253B2

(12) United States Patent
Ferguson et al.

(10) Patent No.: US 7,967,253 B2
(45) Date of Patent: *Jun. 28, 2011

(54) ANTENNA FAIRING AND METHOD

(75) Inventors: Stanley D. Ferguson, Renton, WA (US);
William W. Herling, Bellevue, WA (US); David A. Treiber, Seattle, WA (US)

(73) Assignee: The Boeing Company, Chicago, IL (US)

( * ) Notice: Subject to any disclaimer, the term of this patent is extended or adjusted under 35 U.S.C. 154(b) by 656 days.

This patent is subject to a terminal disclaimer.

(21) Appl. No.: 12/033,356

(22) Filed: Feb. 19, 2008

(65) Prior Publication Data

US 2010/0038488 A1 Feb. 18, 2010

Related U.S. Application Data

(63) Continuation-in-part of application No. 11/014,583, filed on Dec. 16, 2004, now abandoned.

(60) Provisional application No. 60/537,447, filed on Jan. 16, 2004.

(51) Int. Cl.
*B64C 1/38* (2006.01)
(52) U.S. Cl. ...... 244/130; 244/200; 244/121; 244/123.1
(58) Field of Classification Search ............... 244/123.1, 244/123.13, 123.14, 130, 199.1, 204, 200, 244/200.1, 121, 129.1, 119, 120, 117 R; D12/319, D12/345; 343/705, 708
See application file for complete search history.

(56) References Cited

U.S. PATENT DOCUMENTS

| 2,575,757 | A | * | 11/1951 | Hardy | 52/202 |
| 2,612,606 | A | * | 9/1952 | Wehner | 343/708 |
| 2,755,216 | A | * | 7/1956 | Lemons | 156/155 |
| 2,873,931 | A | * | 2/1959 | Fleischmann | 244/200 |
| 3,002,190 | A | * | 9/1961 | Oleesky et al. | 343/907 |
| 3,463,418 | A |   | 8/1969 | Miksch | |
| 3,604,661 | A |   | 9/1971 | Mayer, Jr. | |
| 4,189,120 | A |   | 2/1980 | Wang | |
| 4,318,328 | A | * | 3/1982 | Rona | 89/1.815 |
| 4,365,574 | A |   | 12/1982 | Norminton | |
| 4,458,936 | A |   | 7/1984 | Mulholland | |
| 4,661,821 | A | * | 4/1987 | Smith | 343/743 |
| 4,867,394 | A | * | 9/1989 | Patterson, Jr. | 244/54 |
| 4,878,062 | A | * | 10/1989 | Craven et al. | 343/872 |
| 5,093,313 | A |   | 3/1992 | Minovitch | |
| 5,209,434 | A | * | 5/1993 | Lo Presti et al. | 244/130 |

(Continued)

OTHER PUBLICATIONS

Appendix III pp. 1-18 http://web.archive.org/web/20020621082045/http://pdas.com/sections45.htm, 2002.

(Continued)

*Primary Examiner* — Joshua J Michener
(74) *Attorney, Agent, or Firm* — Harness, Dickey & Pierce, P.L.C.

(57) ABSTRACT

A fairing suitable for enclosing a component mounted on an exterior surface of a mobile platform, and more particularly on an outer surface of a high speed mobile platform such as a jet aircraft or an aerospace vehicle. The fairing provides aggressive closure angles for optimum RF performance when used to house an antenna that is scanned to varying azimuth and elevation angles. The fairing further provides low aerodynamic drag, is scalable to enclose components having wide ranging dimensions, and provides attached flow with minimum separation of airflow thereover for airflows experienced by high speed jet aircraft, and reduces or eliminates RF reflections within the fairing from the RF beam of the antenna.

20 Claims, 15 Drawing Sheets

U.S. PATENT DOCUMENTS

| | | | |
|---|---|---|---|
| 5,216,435 A * | 6/1993 | Hirata et al. | 343/853 |
| D344,489 S * | 2/1994 | Webb | D12/345 |
| 5,458,299 A | 10/1995 | Collins et al. | |
| 5,689,276 A * | 11/1997 | Uematsu et al. | 343/872 |
| 5,692,709 A * | 12/1997 | Mihora et al. | 244/204 |
| 5,805,111 A * | 9/1998 | Brettner et al. | 342/455 |
| 5,986,611 A * | 11/1999 | Harrison et al. | 343/705 |
| D432,073 S * | 10/2000 | Coyle | D12/345 |
| 6,204,820 B1 * | 3/2001 | Jensen, Jr. | 343/713 |
| 6,414,644 B1 | 7/2002 | Desargant et al. | |
| 6,570,540 B2 * | 5/2003 | Desargant et al. | 343/705 |
| 6,608,596 B2 * | 8/2003 | Bien et al. | 343/705 |
| 6,751,442 B1 * | 6/2004 | Barrett | 455/11.1 |
| D497,586 S | 10/2004 | Ferguson | |
| 6,814,474 B2 * | 11/2004 | Groeller | 362/485 |
| 6,831,610 B2 * | 12/2004 | Quagliaro | 343/705 |
| 6,844,856 B1 * | 1/2005 | Wright | 343/705 |
| 6,856,295 B2 * | 2/2005 | Desargant et al. | 343/705 |
| 6,992,640 B2 * | 1/2006 | Usami et al. | 343/872 |
| 7,123,199 B2 * | 10/2006 | Rotta | 343/708 |
| 2003/0052829 A1 * | 3/2003 | Desargant et al. | 343/705 |
| 2003/0142024 A1 * | 7/2003 | Carson | 343/705 |
| 2006/0006287 A1 | 1/2006 | Ferguson et al. | |

OTHER PUBLICATIONS

Airfoil Gemoetry, pp. 1-2 http://www.desktopaero.com/appliedaero/airfoils1/airfoilgeometry.html, Apr. 26, 2006.

* cited by examiner

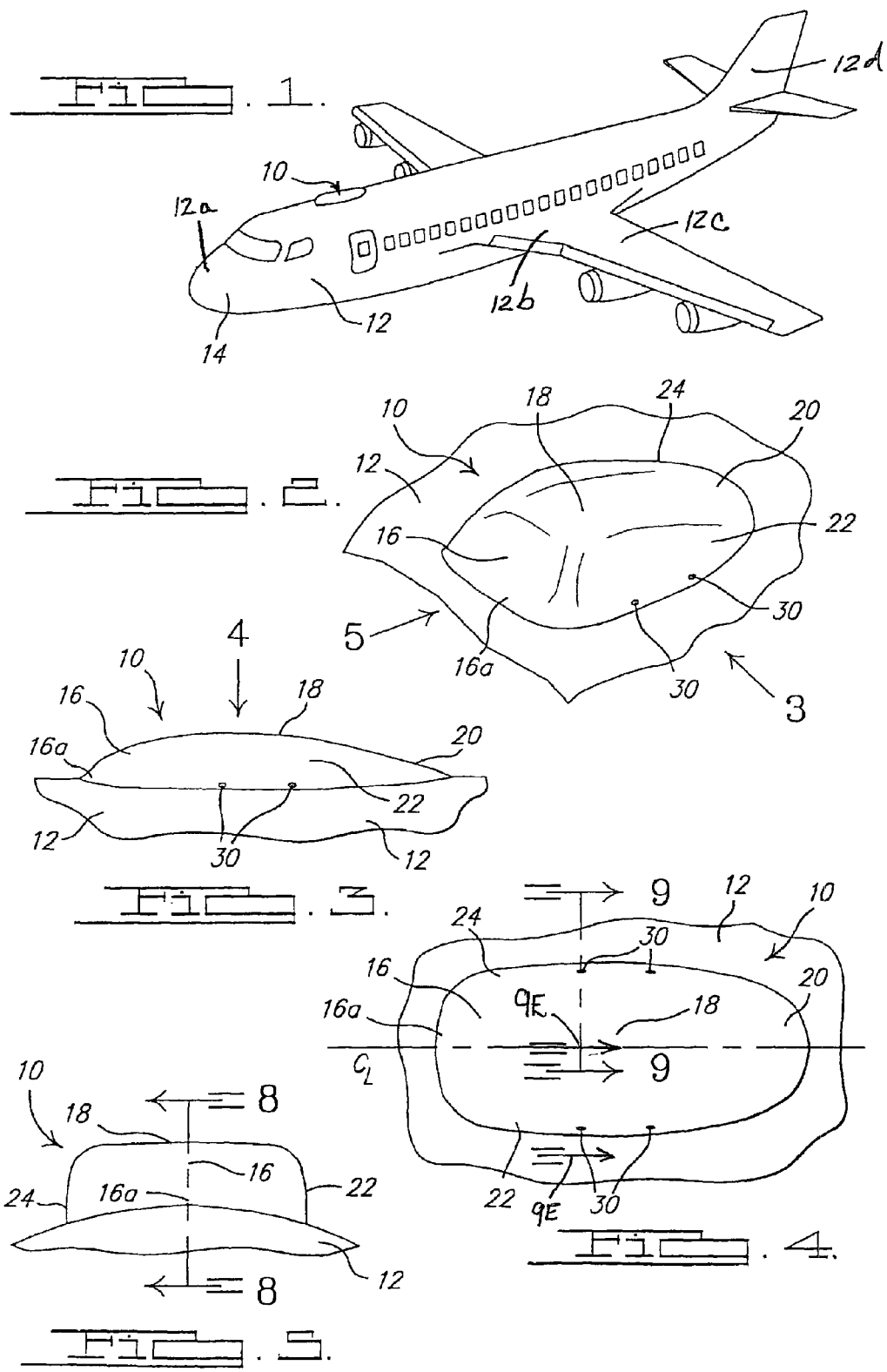

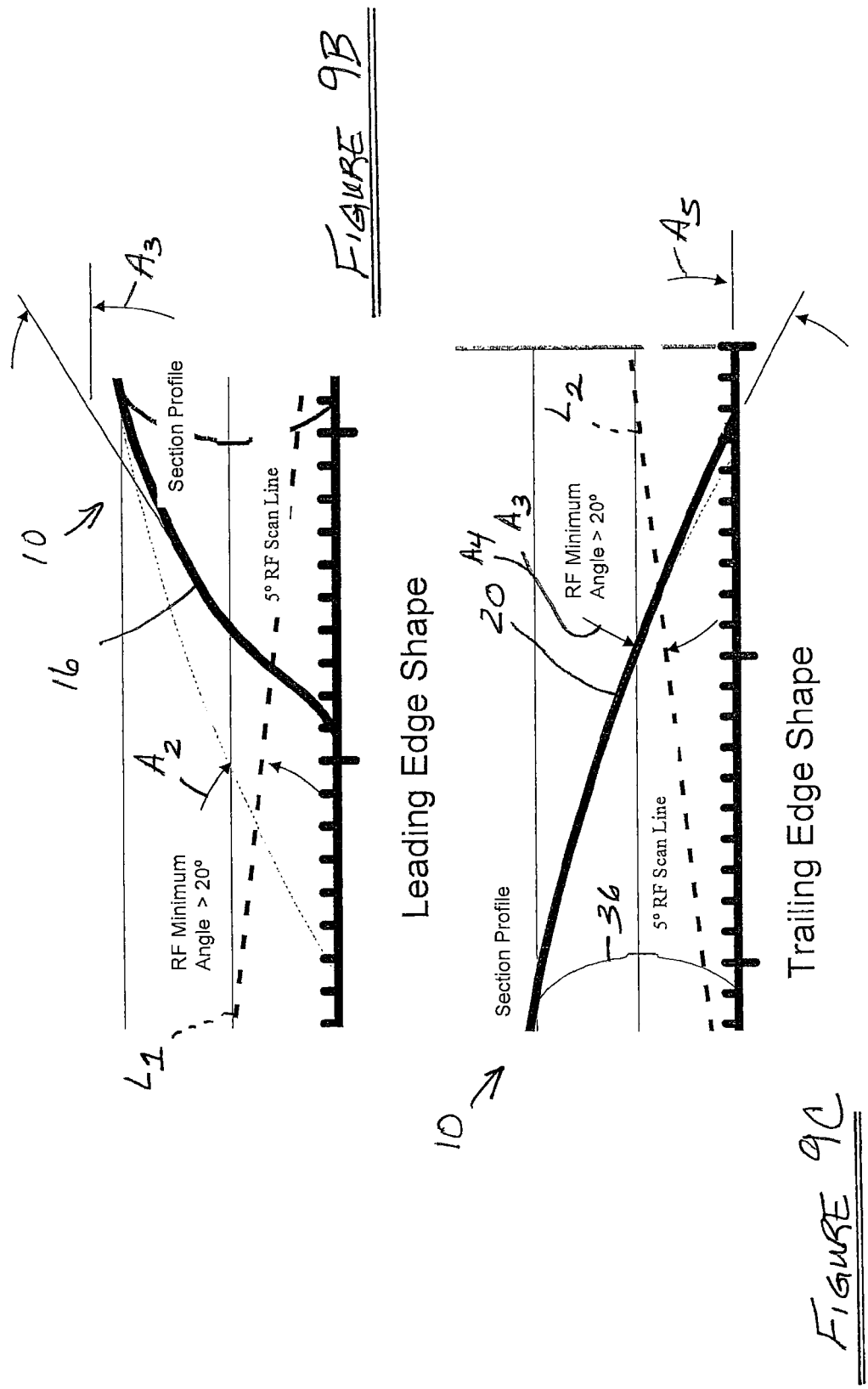

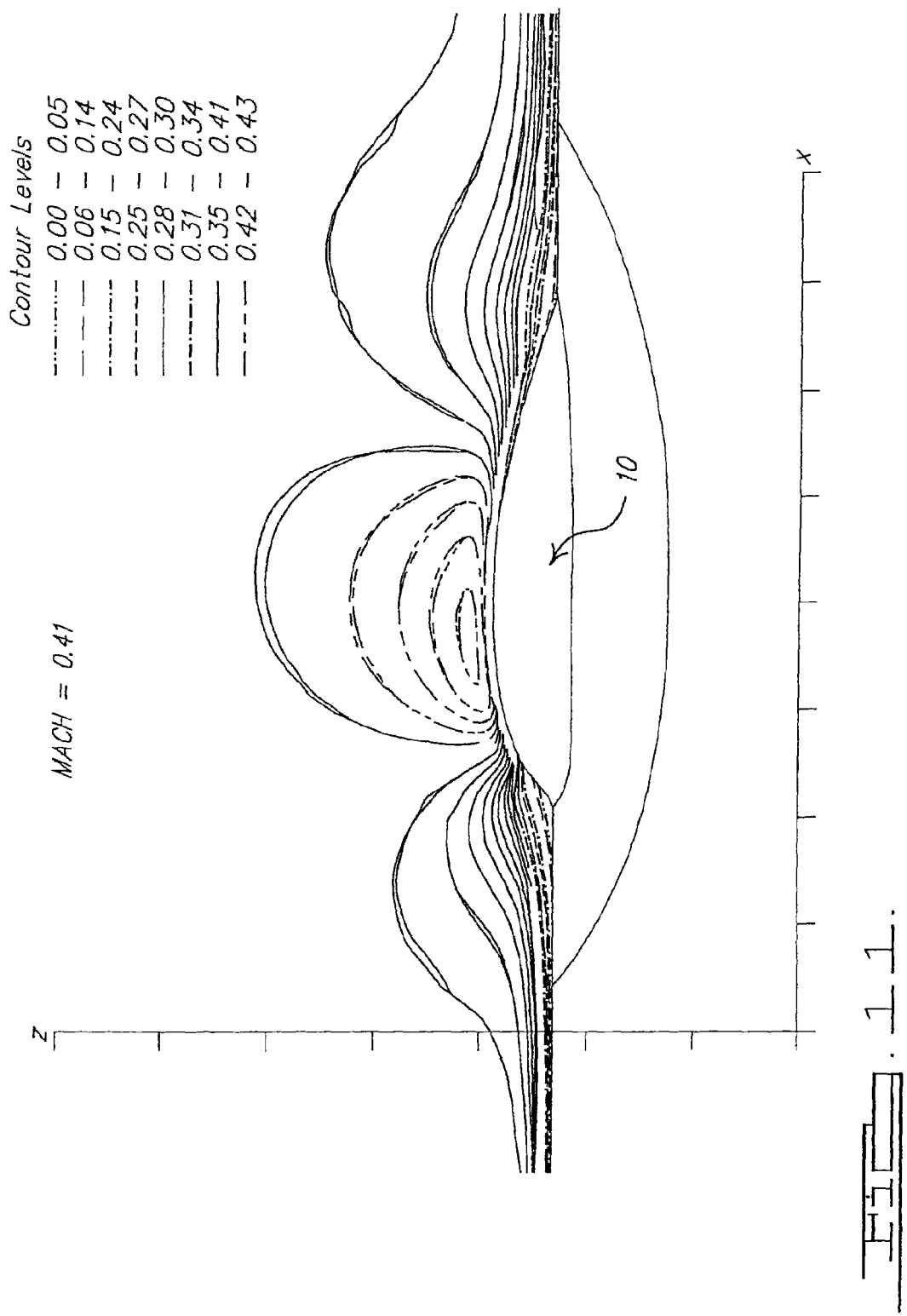

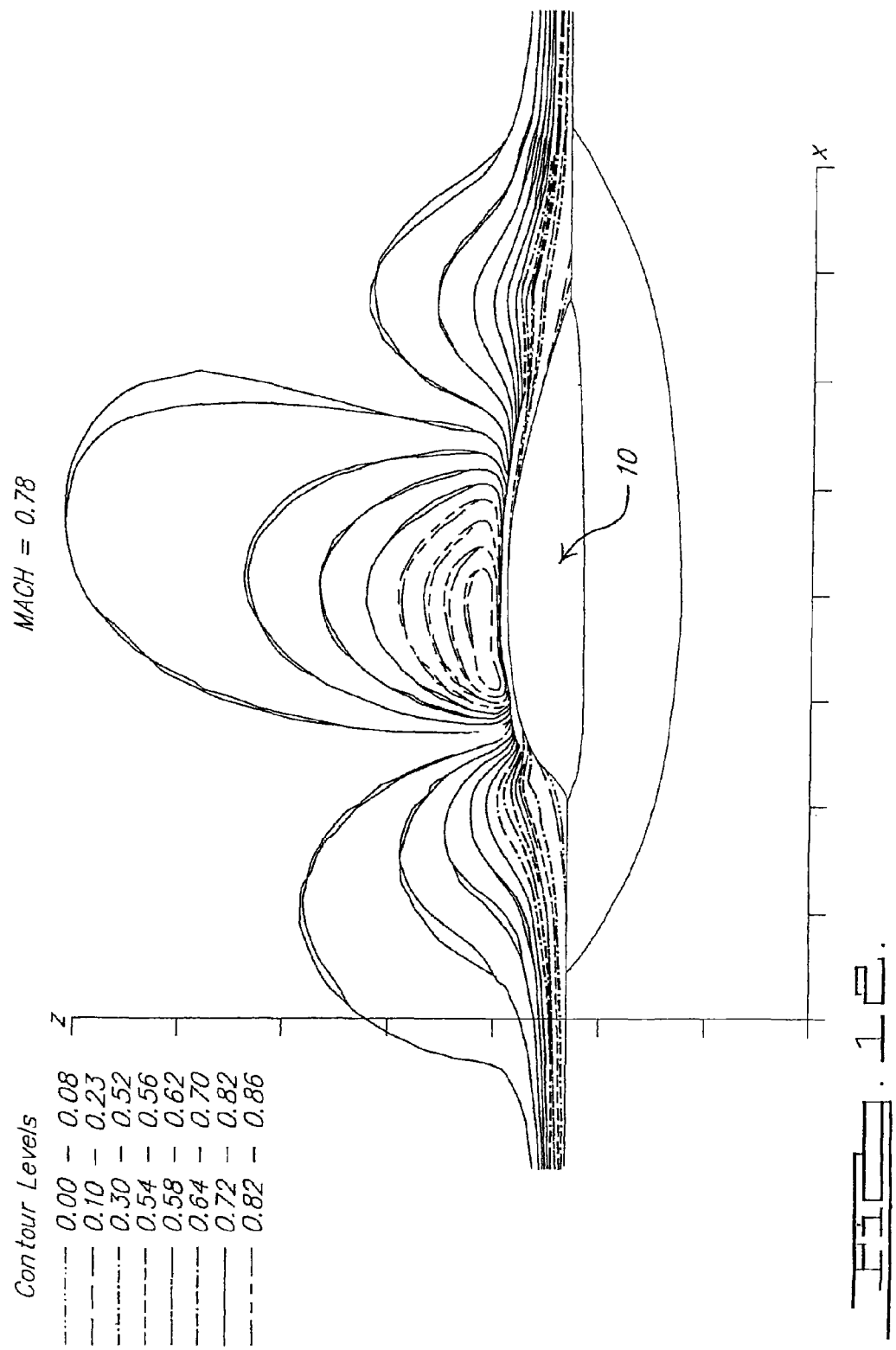

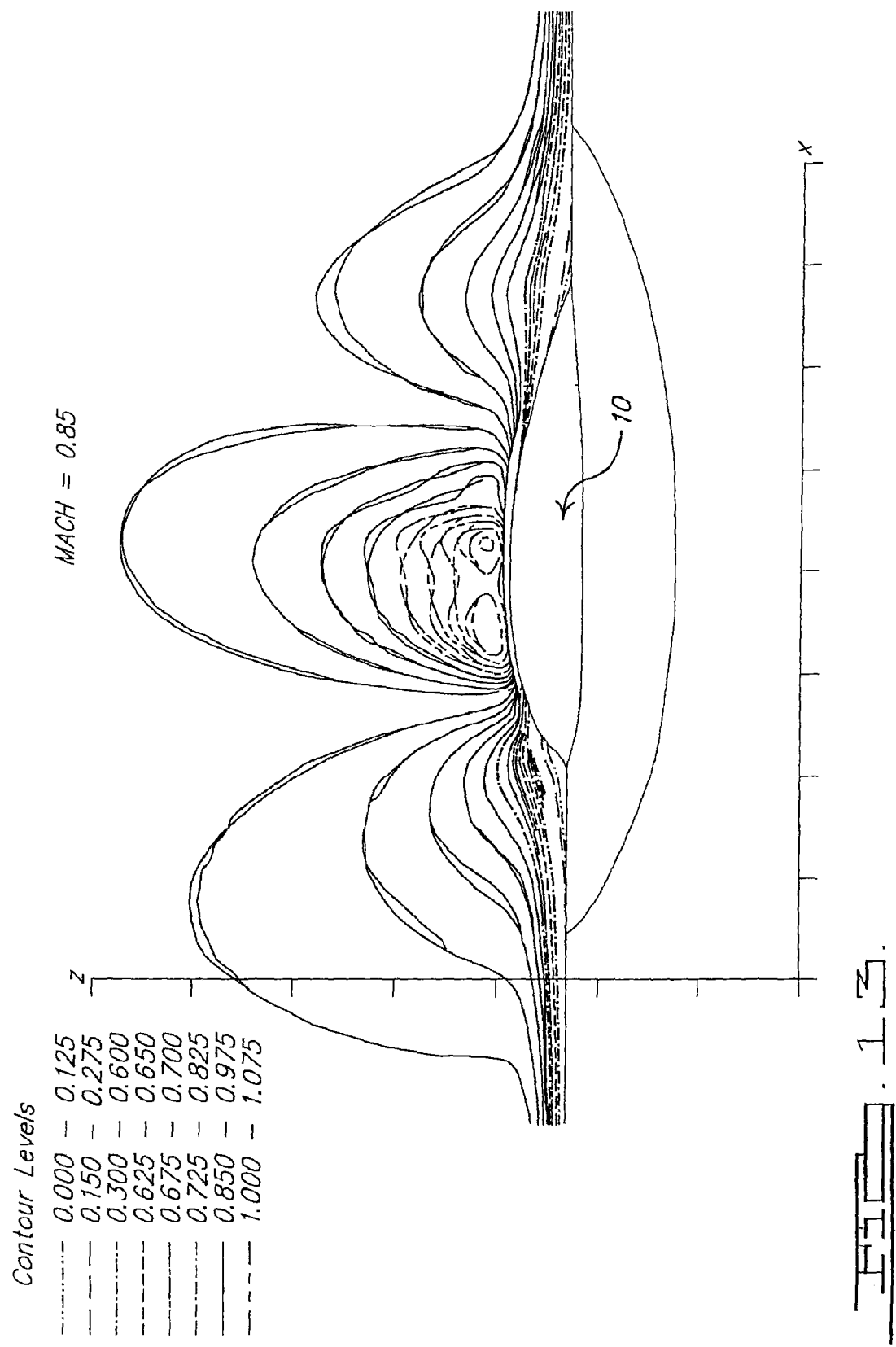

ANTENNA FAIRING AND METHOD

PRIORITY INFORMATION

The present application is a continuation in part of U.S. application Ser. No. 11/014,583, filed Dec. 16, 2004, which in turn claims priority from U.S. provisional application Ser. No. 60/537,447, filed Jan. 16, 2004, entitled "Antenna Fairing and Method", the entire contents of which are incorporated by reference herein.

CROSS REFERENCE TO RELATED APPLICATIONS

The present application is related in general subject matter to U.S. application Ser. No. 11/014,582 filed on Dec. 16, 2004 concurrently herewith, entitled "Fairing and Airfoil Apparatus and Method".

FIELD

The present system generally relates to airfoils and fairings, and more particularly to a fairing particularly well adapted for enclosing a moving component thereunder on an exterior surface of a high speed mobile platform.

BACKGROUND

Mobile platforms such as aircraft, busses, trains, ships, rotorcraft, etc., typically require an externally mounted antenna to enable communications with a base station transceiver. For example, the CONNEXION BY BOEING$^{SM}$ system enables high speed transmission of digital information from a base transceiver to high speed mobile platforms such as (but not limited to) commercial jet aircraft. With any mobile platform, aerodynamics can be an important consideration. With high speed moving aircraft such as commercial jet aircraft, aerodynamics becomes an especially important consideration in the performance of the aircraft and its operating costs.

With any mobile platform, the mounting of an antenna on an external surface thereof generally operates to negatively affect the aerodynamics of the mobile platform. To protect the antenna and to further mitigate the negative aerodynamic impact of the antenna, a fairing may be used to enclose the antenna over the outer surface portion of the mobile platform. In this instance, the shape of the fairing is highly important to providing good aerodynamic performance, and therefore ameliorating the negative aerodynamic influence that would otherwise be introduced by the presence of the antenna on the exterior surface of the mobile platform.

Present day fairings, however, are not especially well suited (i.e., shaped) to cover antennas having dimensions required for use with high frequency, satellite based communication systems. Such antennas often project up to 12 inches (30.48 cm) or more above the outer surface of the mobile platform upon which they are mounted, and therefore present a significant "protrusion" or projection that can negatively affect the aerodynamic performance and operational cost of a high speed mobile platform.

SUMMARY

The system and method is directed to a uniquely shaped airfoil which is scaled in dimensions to form a fairing. The fairing is especially well adapted for use on high speed mobile platforms to enclose components within an interior envelope defined by the fairing. The fairing is highly aerodynamic and presents a very low aerodynamic drag, even with high speed mobile platforms such as commercial jet aircraft. The fairing also provides frontal, top and tapering rear portions that enable minimum RF grazing angles at the frontal and tapering rear portions to be achieved for a scannable RF antenna that may be mounted under the fairing.

In one form, the fairing is adapted to enclose an electronic component having a chord-wise height (or a thickness) of about 12 inches or more, while still producing a minimal aerodynamic drag on a high speed mobile platform. In one form the fairing produces a drag of no more than about 50 pounds of force when the mobile platform on which it is supported is traveling at a speed of about 0.85 Mach.

In another form the fairing includes a fillet formed in a frontal area thereof. The fillet helps to reduce the stagnation of airflow at a leading edge of the fairing.

In one form the fairing also includes a chord-wise thickness-to-length ratio of about 12%.

With each of the above-described embodiments, the fairing is capable of enclosing an electronic component, for example a rotating antenna, thereunder without restricting movement of the antenna.

The features, functions, and advantages can be achieved independently in various embodiments of the present system or may be combined in yet other embodiments.

BRIEF DESCRIPTION OF THE DRAWINGS

The present system will become more fully understood from the detailed description and the accompanying drawings, wherein:

FIG. 1 is a simplified view of an aircraft incorporating a fairing of the present system thereon;

FIG. 2 is an enlarged prospective front/side view of the fairing of FIG. 1;

FIG. 3 is a side view of the fairing taken in accordance with directional arrow 3 in FIG. 2;

FIG. 4 is a plan view of the fairing of FIG. 3 taken in accordance with directional arrow 4 in FIG. 3;

FIG. 5 is a front view of the fairing taken in accordance with directional arrow 5 in FIG. 2;

FIG. 9B illustrates the RF minimum grazing angle that the leading edge of the fairing provides, for an antenna positioned underneath the fairing;

FIG. 9C illustrates the RF minimum grazing angle at the trailing edge of the fairing;

FIG. 11 is a flow field plot illustrating Mach values for airflow over the fairing at 0.41 Mach;

FIG. 12 is a plot illustrating a 0.78 Mach flow field for airflow over the fairing;

FIG. 13 is a plot illustrating a 0.85 Mach flow field for air flowing over the fairing;

DETAILED DESCRIPTION

Figure 6:
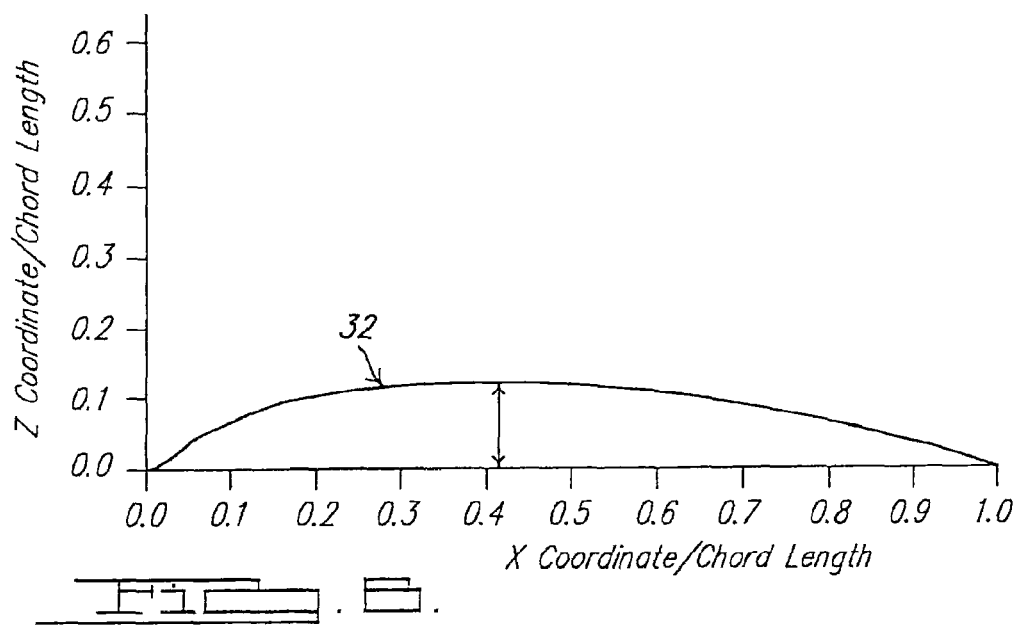
FIG. 6 is a side view graph illustrating the airfoil shape that is used to form the fairing of FIGS. 1-5.

The following description of various embodiment(s) is merely exemplary in nature and is in no way intended to limit the system, its application, or uses.

Referring to FIG. 1, there is shown a fairing 10 in accordance with one embodiment of the present disclosure. The fairing 10 is illustrated as being disposed on an outer surface of a fuselage 12 of a mobile platform 14, which in this example is illustrated as a jet aircraft. It will be appreciated that the fairing 10 can be readily used with virtually any mobile platform where it is important to enclose some component mounted on an exterior surface of the mobile platform so that the negative aerodynamic affects of the component can be minimized. As can be appreciated, with high speed mobile platforms such as aircraft, rotorcraft, space vehicles and high speed land vehicles, the aerodynamic performance of the mobile platform can be an important consideration. The fairing 10 serves to ameliorate the negative affects that would otherwise be introduced by an external component mounted on a mobile platform, and also to prevent separation of the airflow flowing over the fairing 10 that could produce shocks perceptible to occupants within the mobile platform.

With reference to FIGS. 2-5, the fairing 10 can be seen in greater detail. The fairing 10 includes a frontal portion 16 that forms a leading edge surface, a top or upper portion 18, a tapering rear portion 20 that forms a trailing edge surface, and gradually curving side portions 22 and 24 on opposite sides of the top portion 18. In FIG. 3, the frontal portion 16 can be seen to include a small fillet 26 at a lower edge thereof. The fillet 26, in one form, has an initial slope of approximately 25 degrees and a radius of curvature of about 15 inches (380 mm). The fillet 26 helps to reduce or eliminate the stagnation region at a leading edge 16a of the frontal portion 16. As will be appreciated, the presence of a stagnation region is undesirable. Fillet 26 helps to reduce or eliminate the presence of such a region and to insure that airflow moves smoothly over the fairing 10 as the mobile platform 14 is traveling at moderate to high Mach speeds (typically 0.70 Mach-0.90 Mach).

With further reference to FIGS. 2-5, the fairing 10 further preferably includes a pair of vents 30 on each of the side portions 22 and 24. Vents 30 are further preferably formed close to the area of intersection of side portions 22 and 24 and the outer surface 28 of the mobile platform 14. While four vents 30 are shown, it will be appreciated at greater or lesser number of such vents could be incorporated. The vents 30 serve to equalize the pressure on interior and exterior surfaces the fairing. The vents 30 are shown as circular shaped vents, however other shapes such as, for example, rectangular or square shaped vents, could also be employed. In one form the vents 30 define circular openings of about 0.375 inch (9.525 mm) each in diameter.

It will be appreciated that in some applications the vents 30 may not be needed. However, if the fairing 10 is incorporated on an airborne mobile platform such as a jet aircraft, then it is preferred to include the vents because pressure equalization on the fairing 10 will be desired during climb and descent phases of flight of the aircraft.

The fairing 10 can be used to enclose any component that is not itself aerodynamically shaped, that would otherwise introduce more than insignificant drag on a mobile platform during its operation. The fairing 10, in one implementation, is used to enclose an antenna and to provide sufficient clearance to allow the antenna to be rotated without interference from any portion of the fairing 10. The fairing 10 is preferably manufactured from a lightweight structural material compatible with its intended use, e.g., transparent to radio frequency transmission such as glass or quartz, either in solid laminate or composite form. Other suitable materials could also be employed.

Referring to FIG. 6, a graph is presented illustrating the thickness-to-length ratio of an airfoil shape 32 that is used to form the fairing 10. Essentially, airfoil shape 32 is scaled as needed in its x, y and z directions to provide an enclosure sufficient to house the component over which the fairing 10 is secured. In one preferred form the airfoil shape 32 has a thickness ratio of preferably about 12%.

Figure 7:
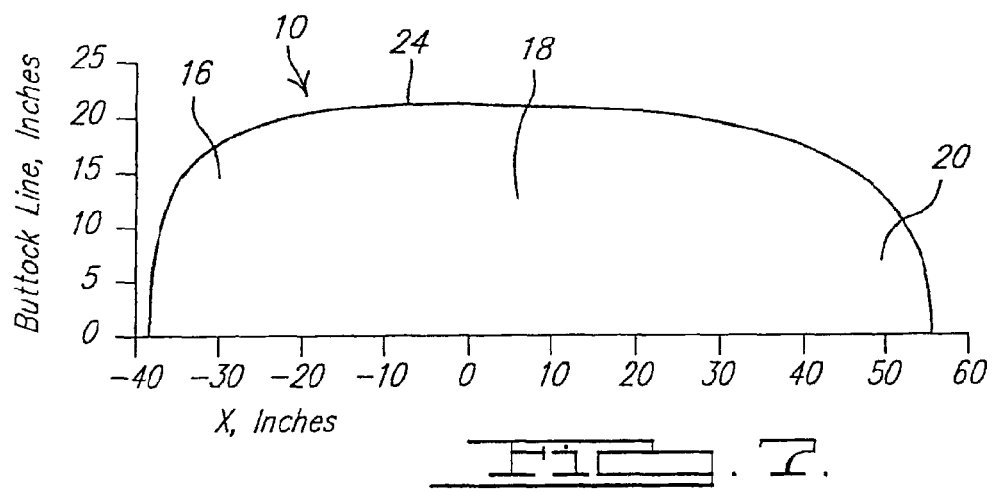
FIG. 7 is a plan view of one-half of the fairing of FIG. 2.

Referring to FIG. 7, a graph illustrating one half of the fairing 10 in plan form can be seen. In this example, the overall chord-wise length (X) of the fairing 10 is preferably between about 90-100 inches (228-254 cm), and more preferably about 94 inches (238.76 centimeters). The maximum buttock length from the longitudinal centerline of the fairing 10 is about 21 inches (53.34 centimeters). The maximum overall buttock length, in this example, is about 42 inches (106.68 cm).

Figure 8:
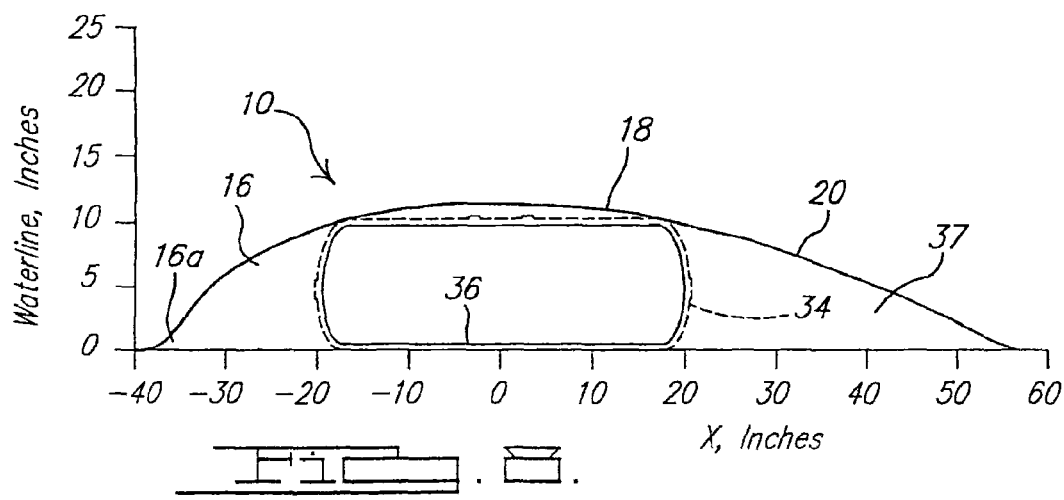
FIG. 8 is a graph illustrating the thickness and length of the fairing in accordance with section line 8-8 in FIG. 5.

Referring to FIG. 8, a graph illustrating the fairing 10 in relation to an envelope 34 can be seen, where the envelope 34 defines that space required for enabling movement of an scannable antenna 36 within an interior area 37 of the fairing 10, where the antenna may have dimensions of typically about 39 inches in swept diameter by 9.5 inches high (99 cm by 241.3 mm). The antenna in this example can be scanned in both azimuth and elevation to optimally track external signal devices (such as orbiting satellites).

In this example the fairing 10 has an overall height maximum height of about 12 inches (30.48 cm). It will be appreciated that the fairing 10 can be scaled in accordance with the basic airfoil shape 32 shown in FIG. 6 to accommodate larger or smaller electronic components mounted thereunder.

Figure 9:
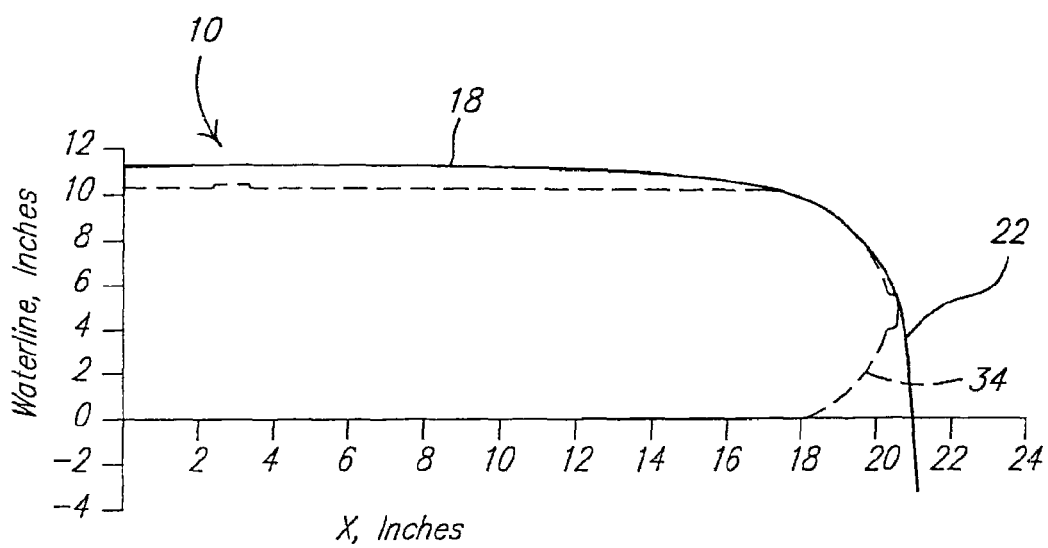
FIG. 9 is a front view graph illustrating a profile of one half of the fairing.
Figure 9A:
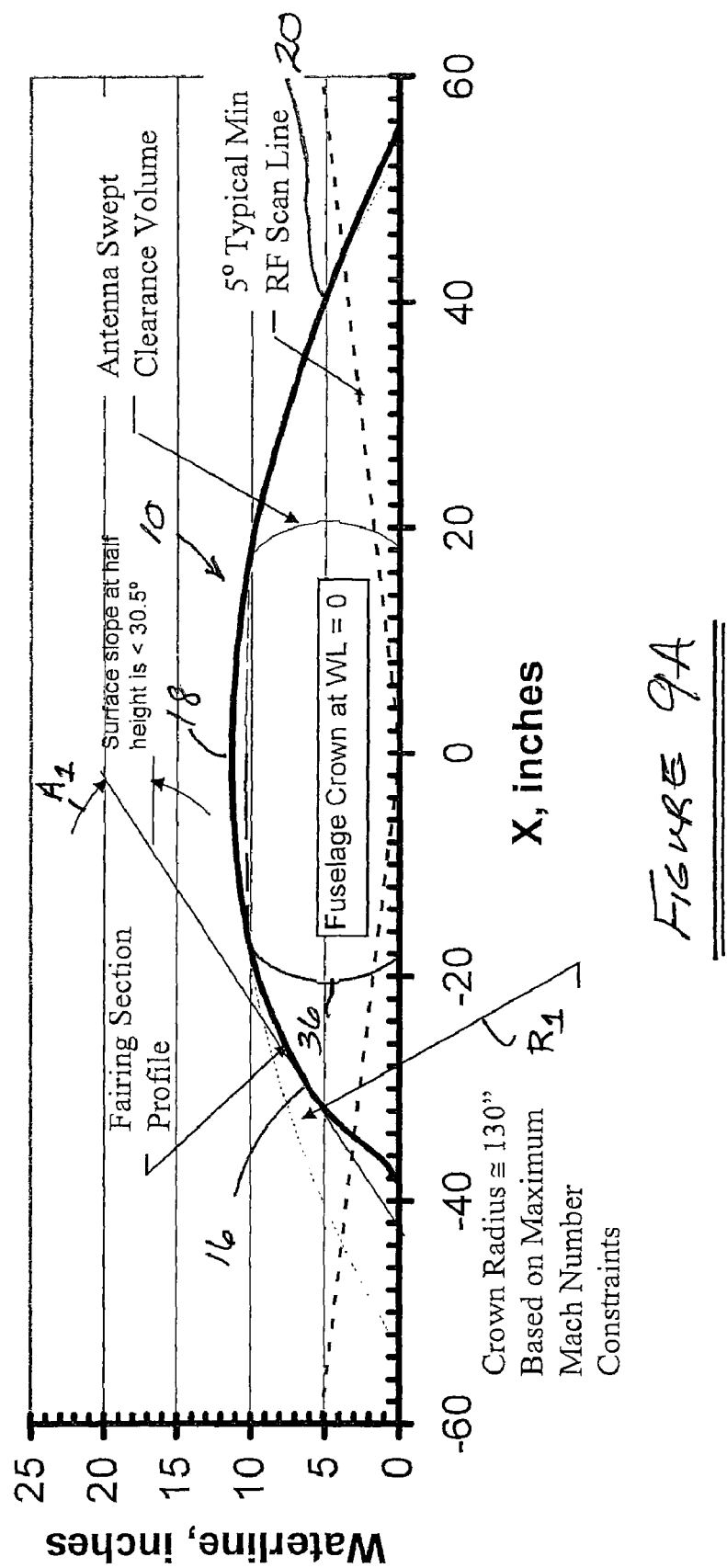
FIG. 9A is an illustration of the fairing in accordance with section line 8-8 in FIG. 5, which is used to help explain the various dimensions and curvatures of the fairing.

FIG. 9 illustrates the contour of one of the side portions 22 of the fairing 10. FIGS. 9A-9C illustrate additional, enlarged views of the fairing 10 from different perspectives. In FIG. 9A, for convenience, dimensional notations have been added to indicate the positioning of the fairing 10 relative to the axial (i.e., rotational) center of the antenna 36, which is at 0 inch on the X-axis. In this example the fore-to-aft radius of curvature R1 of the fairing 10 is approximately 130 inches (330.2 cm). The exact radius of curvature is selected in accordance with the maximum operating Mach number of the aircraft on which the fairing 10 will be used to avoid trailing edge flow separation.

In FIG. 9A, at the half height point of the fairing 10, which in this example is about 6 inches (15.24 cm), a line tangent drawn tangent to the frontal portion 16 at the half height point makes an angle $A_1$ of between about 20-32 degrees, and more preferably between about 30-31 degrees, and still more preferably about 30.5 degrees, relative to the fuselage 12 of the aircraft. The frontal portion angle $A_1$ at the half height point of the fairing 10 (i.e., at about the 6 inch mark) is selected in part based on the desired structural strength needed for airworthiness, in part for handling discrete impact loads (e.g., bird strikes), and in part for RF performance of the antenna 36 while the antenna is scanning at low elevation angles (i.e., at low elevation angles where the antenna beam is directed close to the fuselage 12).

Referring to FIGS. 9B and 9C, the above-described fore-to-aft curvatures of the fairing 10 enable an RF minimum angle $A_2$ of about 20 degrees to be achieved when the antenna 36 is oriented to generate a RF scan line $L_1$ (FIG. 9B) at about 5 degrees elevation, and is directing a beam through the frontal portion 16. The structural maximum angle for surface slope of the frontal portion 16 is preferably about 30.5 degrees at the half height of the frontal portion 16, as indicated by angle $A_3$. In FIG. 9C, the radius of curvature of about 130 inches for the top portion 18 and tapering rear portion 20 enables an RF minimum angle $A_4$ of about 20 degrees to be achieved when the antenna 36 is aimed to generate an RF scan line at about 5 degrees elevation, as indicated by line $L_2$, while directing a beam through the tapering rear portion 20. The RF minimum (grazing) angles of 20 degrees are important to prevent reflections of RF energy being transmitted from the antenna 36 from occurring within the fairing 10. The maximum angle for the tapering rear portion 20 is preferably less than about 23 degrees, as indicated by angle $A_5$.

Thus, the selection of the precise curvatures of the frontal portion 16 and the tapering rear portion 20 are important not only for resisting impacts (such as at the leading edge 16 by a bird strike) and preventing flow separation over the tapering rear portion 20, but also for providing the needed minimum RF angles ($A_2$ and $A_3$) to avoid reflections of RF energy within the fairing 10 when the antenna 36 is directing beams at low elevation angles of about 5 degrees.

Figure 9D:
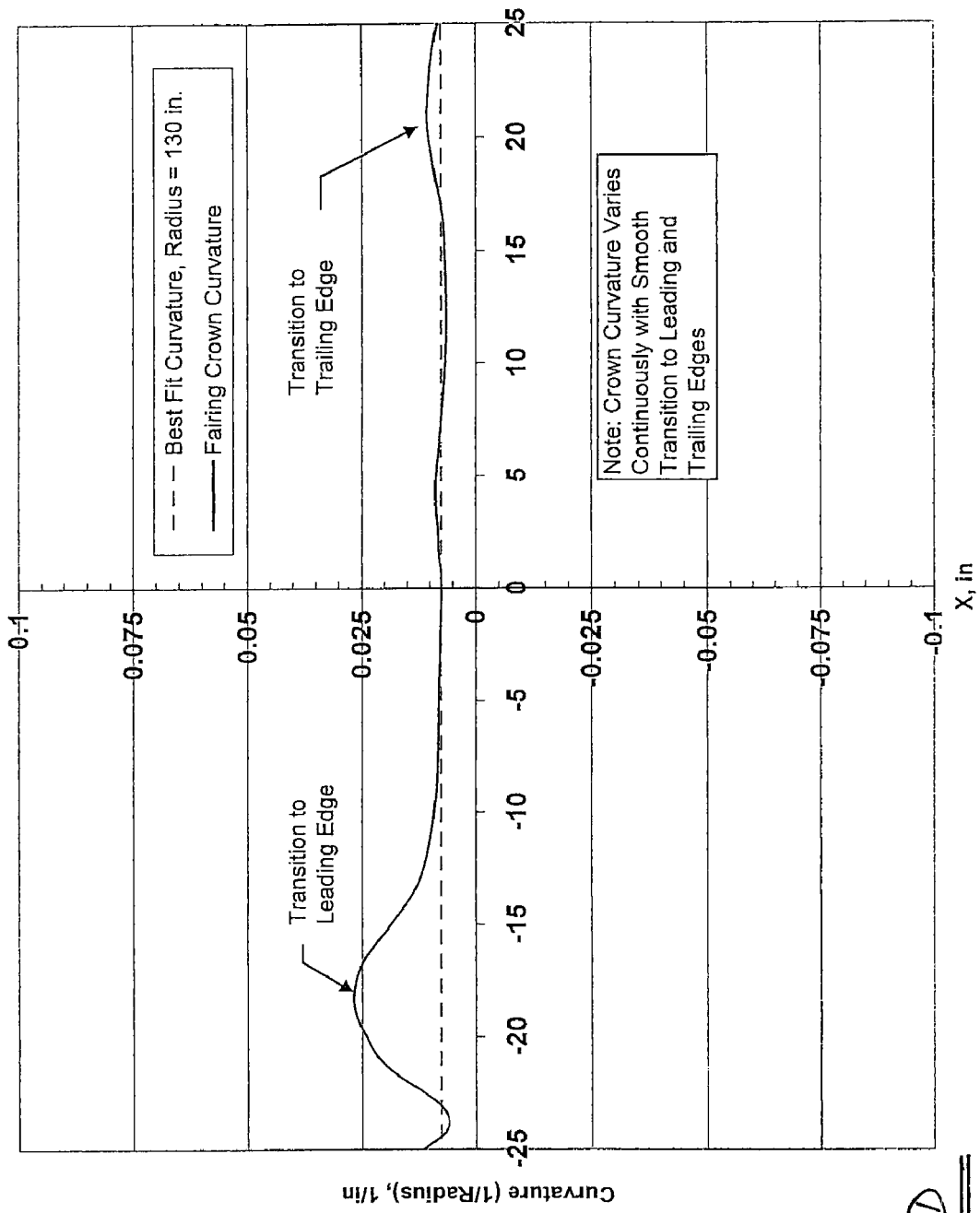
FIG. 9D illustrates a graph showing the smooth variation in crown curvature from the leading to trailing edges of the fairing.

FIG. 9D illustrates that the curvature of the fairing 10 from fore-to-aft (i.e., left to right in the drawing of FIGS. 3 and 9A), varies continuously with smooth transitions from the frontal portion 16 to the top portion 18, and from the top portion to the tapering rear portion 20. The continuously varying curvature helps to provide a smooth airflow over the fairing 10 and to eliminate the possibility of flow separation occurring at the top and taper rear portions 18 and 20.

Figure 9E:
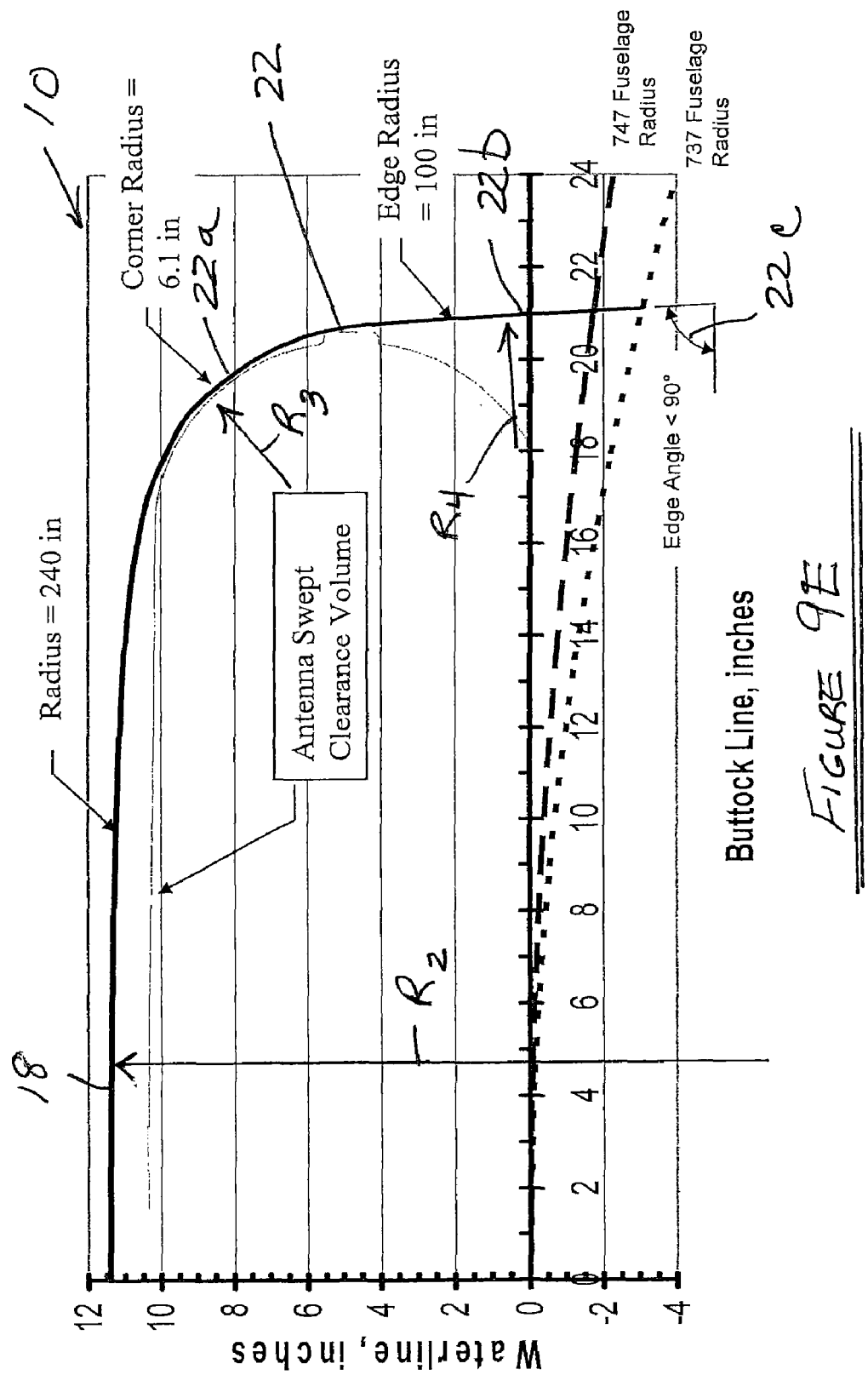
FIG. 9E is a partial cross section of the fairing in accordance with section line 9E-9E in FIG. 4 showing the lateral curvatures of the fairing.

Referring to FIG. 9E, a simplified cross section of one half of the fairing 10 can be seen. The lateral (i.e., port to starboard side) radius of curvature $R_2$ when viewing the fairing 10 mounted on the crown of the fuselage 12 of an aircraft is preferably about 240 inches (609 cm). A radius of curvature $R_3$ of an upper corner 22a of the fairing 10 is about 6.1 inches (15.49 cm). A radius of curvature $R_4$ of a lower side edge 22b of the fairing 10 is about 100 inches (254 cm). The lower side edge 22b makes an angle 22c of between about 85-89 degrees with the fuselage 12. It will be appreciated that the opposite lateral side of the fairing 10 is a mirror image of that shown in FIG. 9E. The radius of curvature $R_2$ is selected to avoid structural buckling for airworthiness loads. The upper corner 22a radius $R_3$ is selected to be within about 30%-55% of the height of the fairing 10 to reduce the chance of structural damage to the upper corner 22a in the event of a discrete impact load (e.g., a bird strike), and also to avoid flow separation in side slip maneuvers, and to avoid scattering of the RF wave being transmitted by antenna 36. It will be noted that the lower side edge 22b radius $R_4$ is almost vertical to minimize frontal area 16 drag.

In the embodiment shown in FIGS. 1-5, the fairing 10 is secured at a point on the fuselage 12 that is ideally located on the forward one-third of the fuselage aft of the fuselage nose 12a (i.e., its tangency point on the crown) and forward of the wing 12c (i.e., the wing intersection 12b with the fuselage 12) or just aft of the wing 12c and well forward of the vertical tail 12d. However, it will be appreciated the exact placement of the fairing 10 on the exterior surface of the fuselage 12 may depend on various factors including the overall dimensions of the fairing 10 as well as the specific design of the mobile platform itself, and possibly the type of antenna that is being housed under the fairing 10. For this application to communicate with satellites, the more forward location improves the antenna performance by reducing the vertical tail 12d blockage in the scanned region. Locations near the fuselage nose 12a or the wing 12b require care to avoid high local fuselage Mach numbers greater than the fairing drag rise Mach (Mach 0.9 for this exemplary design).

Figure 10:
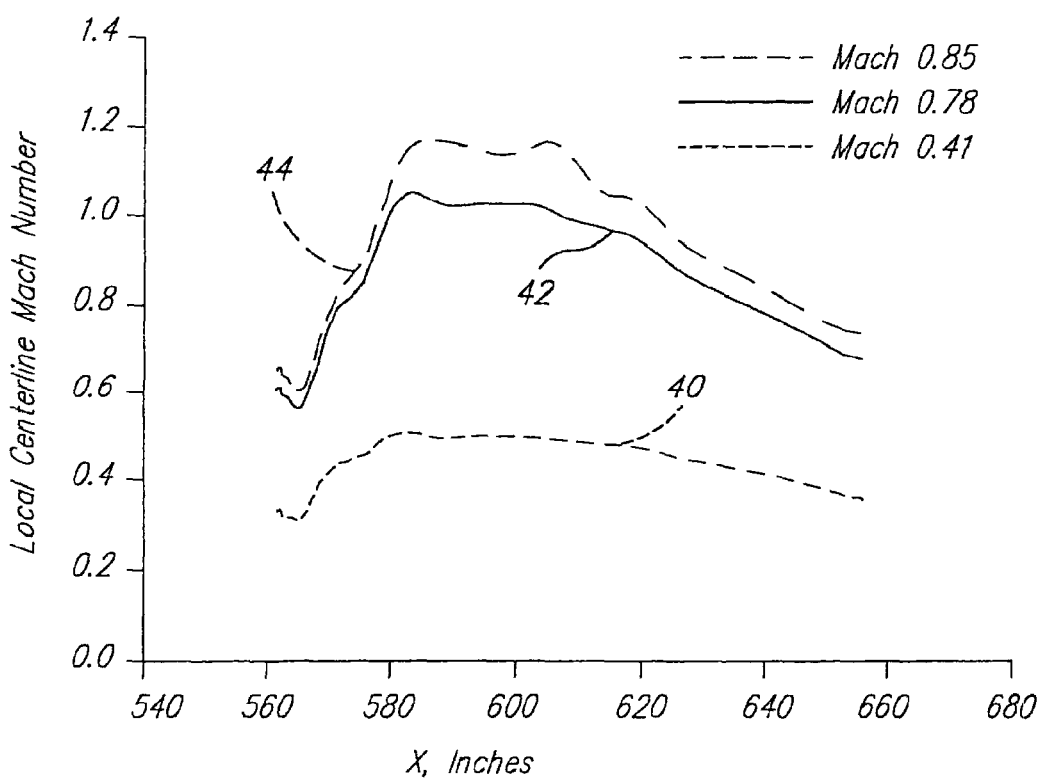
FIG. 10 is a graph illustrating the peak Mach values at various points along the fairing of FIGS. 2-5 at various Mach levels.

FIG. 10 illustrates the peak Mach number profiles for airflow over the fairing 10 when the fairing is moving at a velocity of 0.41 Mach, 0.78 Mach and 0.85 Mach. Curve 40 defines the Mach number profile at 0.41 Mach, curve 42 defines the Mach number profile at 0.78 Mach and curve 44 defines the Mach number profile of air flowing over the fairing 10 with the fairing moving at a velocity of 0.85 Mach. From these three graphs it should be appreciated that the fairing 10 produces low peak Mach number profiles. Put differently, graphs 40-44 indicate that the Mach number of the airflow at the local centerline of the fairing 10 remains very close to the speed of the mobile platform. With the low peak Mach number across the airfoil 10, shocks and flow separation are delayed to speeds above the cruise speed of all modern commercial aircraft. This allows a broad range of applications for the fairing 10 design.

FIGS. 11-13 illustrate the peak Mach values of the airflow over the fairing 10 at speeds of 0.41 Mach, 0.78 Mach and 0.85 Mach, respectively. In particular, FIGS. 11-13 illustrate the local Mach number on the centerline plane of the fairing 10 (as designated by "$C_L$" in FIG. 4). It will be appreciated that the Mach number is the local velocity divided by the speed of sound. The Mach number distribution is nearly flat and uniform across the top portion 18 of the fairing 10 and remains so as the speed increases. This characteristic means that the pressure waves develop uniformly, which avoids the development of shocks and flow separation at high speed. This flow characteristic also keeps the drag low, as can be shown by an optimization computer. The Figures show that low speed flow in the frontal portion 16 region and tapering rear portion 20 are limited to small areas (subject to separated flow). By minimizing the shocks and flow separation, the aerodynamic noise (that can result in aircraft cabin noise), sonic fatigue loads and vibration level (that impacts fatigue life of the installation) are kept low. However, sufficient curvature is maintained in the profile of the fairing 10 to avoid structural buckling when lightweight material is used. Lightweight material is preferred, and particularly lightweight composite materials, that enable excellent radio frequency performance.

Figure 14:
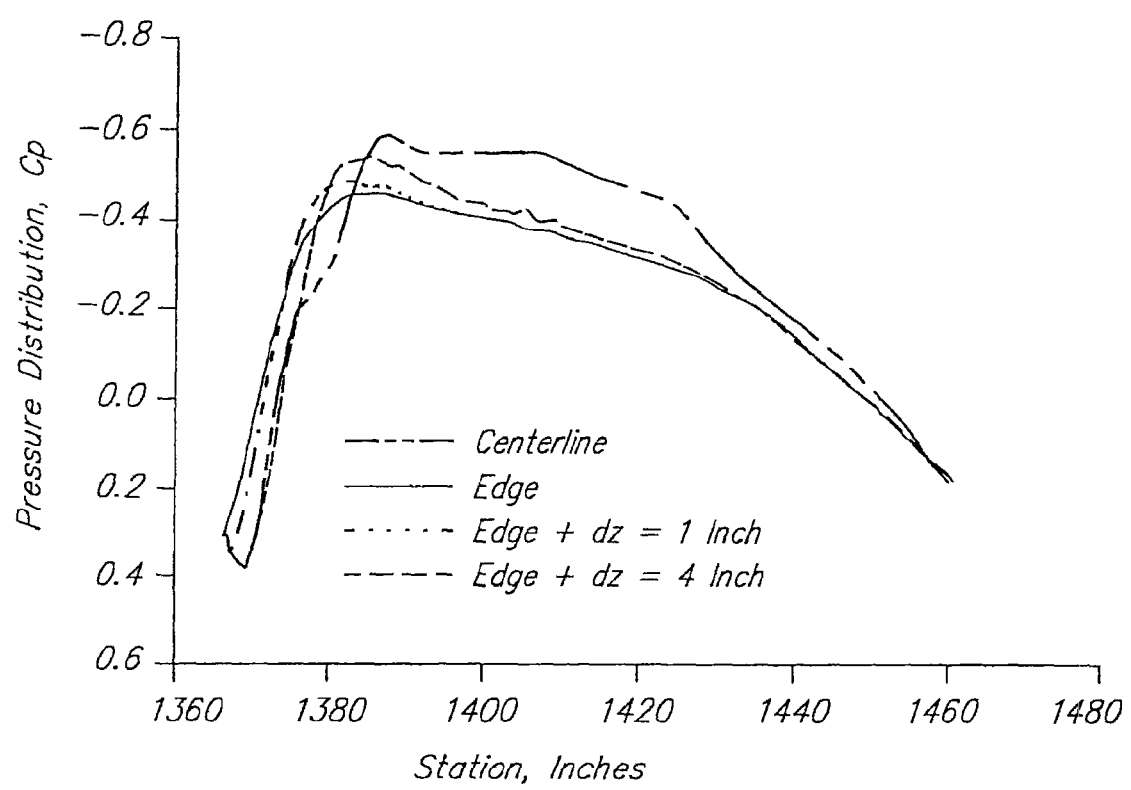
FIG. 14 is a pressure contour graph illustrating the similarity of the pressure contour at the centerline to the buttock line edge of the fairing.

FIG. 14 illustrates a graph of the pressure distribution from the local centerline of the fairing 10 to an edge of the side portion (either 22 or 24), at various points between the local centerline and the outermost edge of the side portion 22 or 24 where the portion insects the fuselage 12 of the mobile platform 14. The uniform pressure distribution is maintained from the centerline to the outboard edge by defining the planform in a manner to allow a common airfoil section. This planform definition provides the desired clearance for the needed antenna swept volume for a rotating antenna. A common airfoil and planform that allows a uniform transition from the centerline to the outboard edge (i.e., the edges adjacent side portions 22 and 24) allows the fairing 10 to maintain good performance across a wide range of flight conditions. Since the pressure profile at the outboard vent location (for vents 30) is similar to the pressure profile on the centerline, properly located vents will equalize the pressure loads across the entire fairing 10. This keeps the normal flight loads low and allows the use of a wide range of material for the fairing 10 design and increases the design life of the installation and internal hardware.

Figure 15:
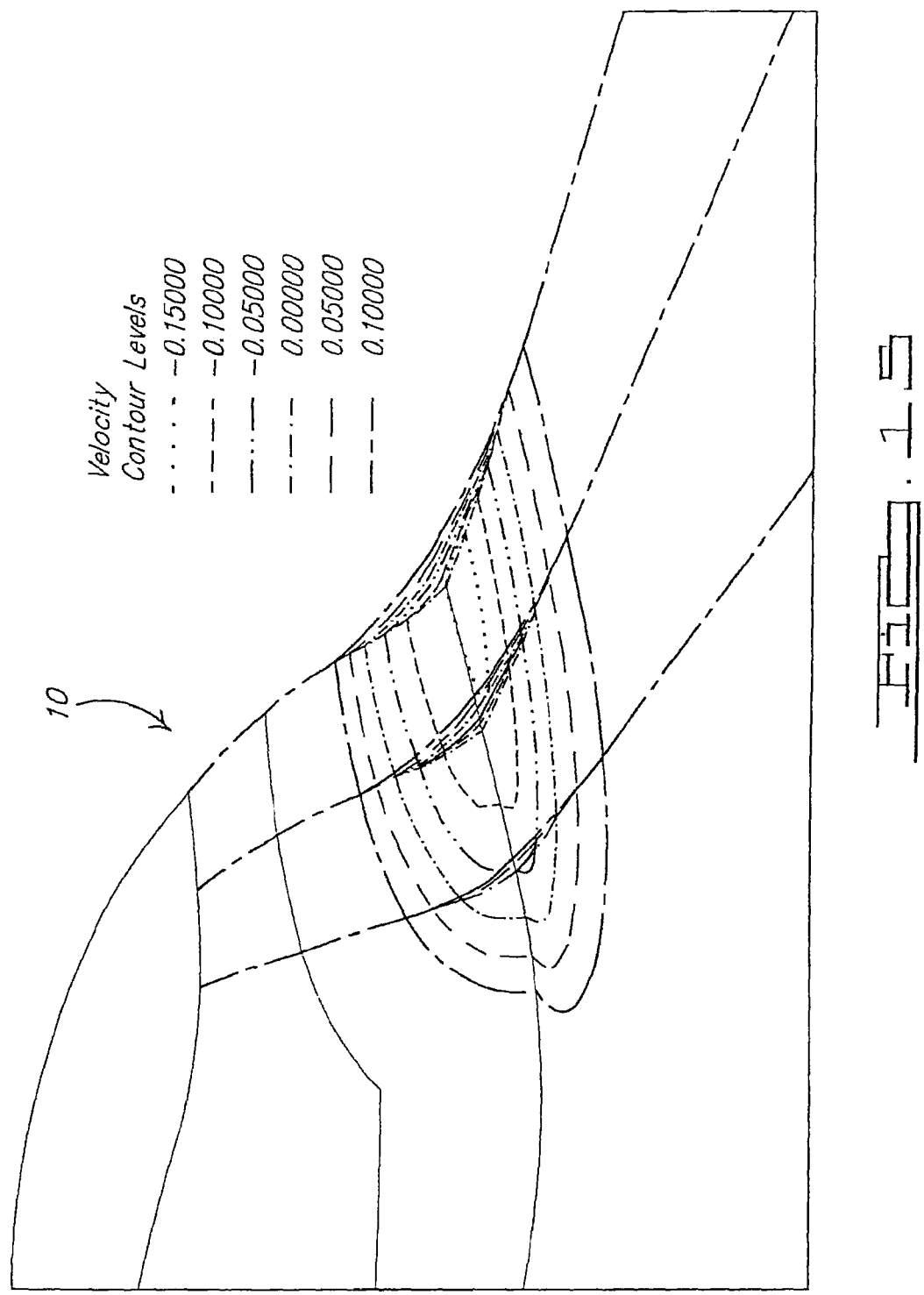
FIG. 15 is a computer generated model of a portion of the fairing illustrating airflow velocity in a recirculation zone at a leading edge of the fairing.

FIG. 15 illustrates in greater detail a portion of the fairing 10 at a leading edge of the front portion 16, and velocity contours for flow in this region. It will be appreciated that when the velocity contour is negative, the flow is upstream. When the velocity is zero, it is the contour line where the flow separates from the surface of the fairing 10.

Figure 16:
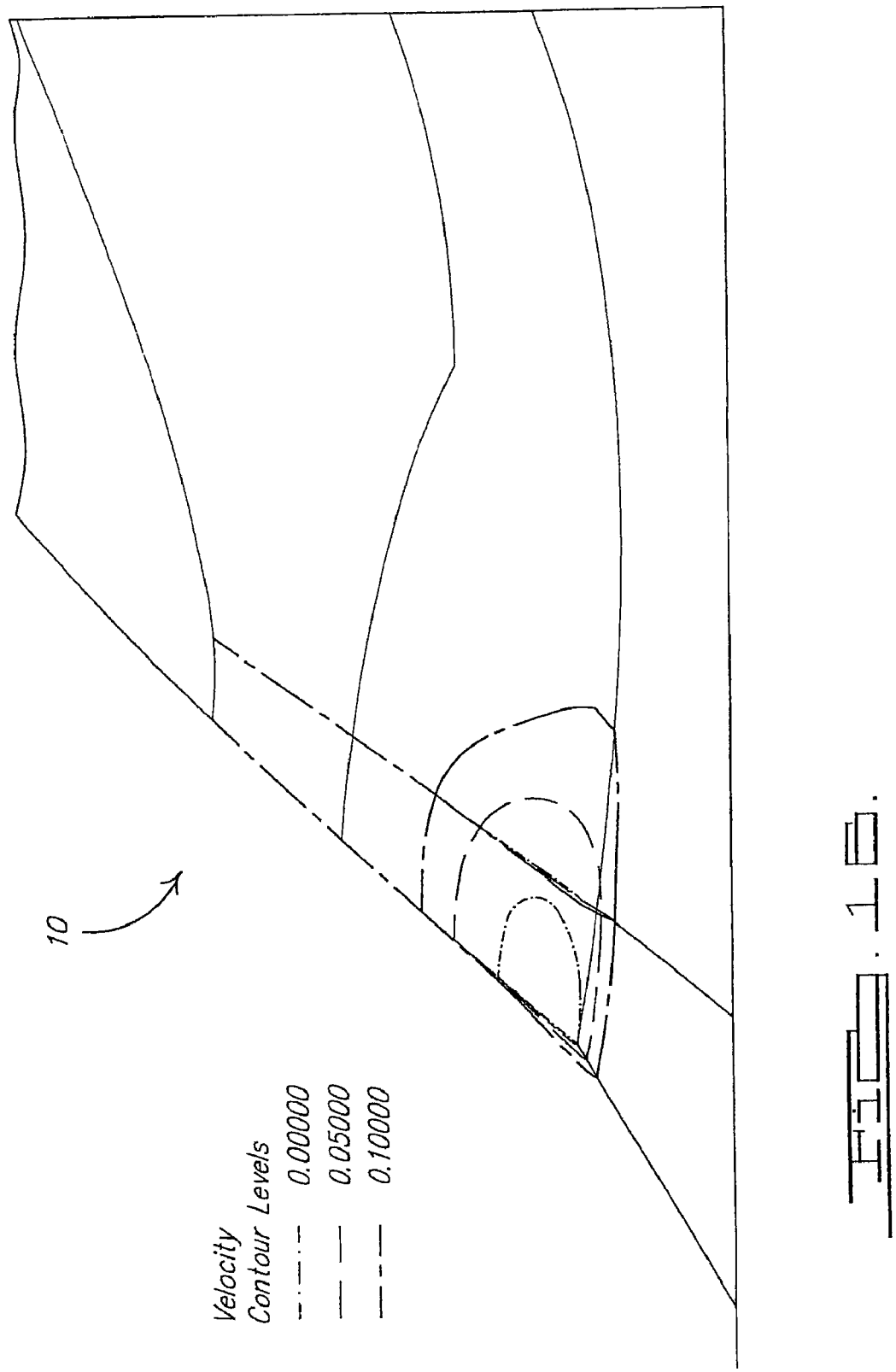
FIG. 16 illustrates a computer generated model of the trailing edge area of the rear portion of the fairing, and the velocity contours at this region.

FIG. 16 illustrates a similar flow characteristic that occurs at a trailing edge region of the tapering rear portion 20 of the fairing 10, but for a different reason. FIG. 16 illustrates normal flow separation where the surface slope becomes too large for the flow to stay attached to the fairing 10. Again, velocity zero represents the boundary and a negative velocity represents upstream flow. A design objective is to maintain these regions (shown in FIGS. 15 and 16) small by the design of the fairing 10 and airfoil 32 shape.

Figure 17:
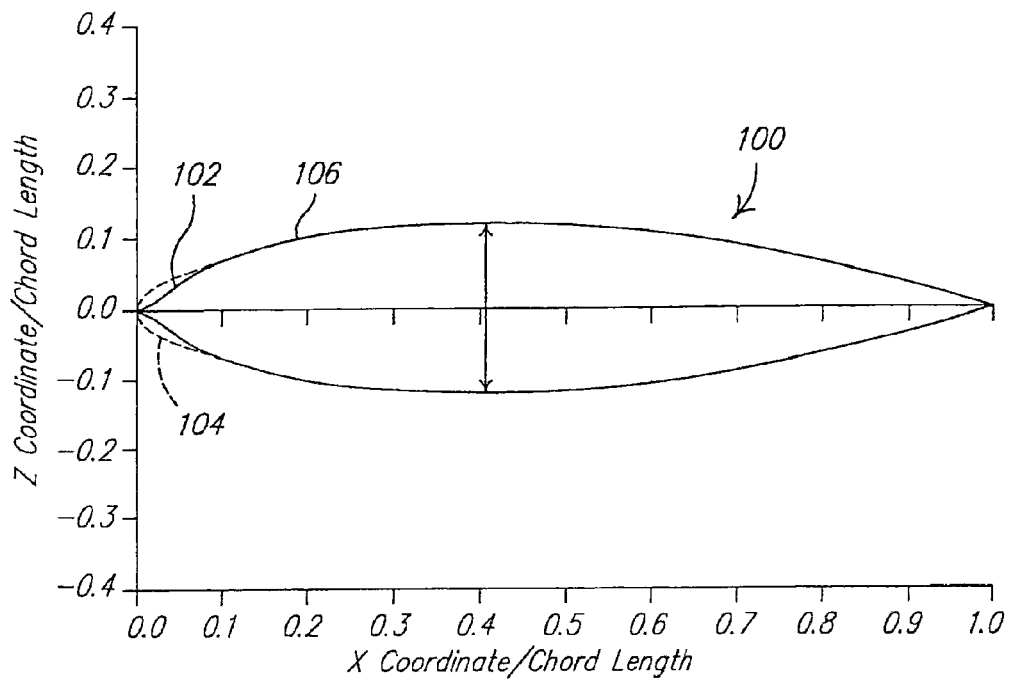
FIG. 17 illustrates a complete airfoil formed in accordance with the curvature of the airfoil of FIG. 6.

FIG. 17 illustrates a complete airfoil 100 in profile along a longitudinal centerline thereof. The airfoil 100 is essentially identical to the airfoil 32 of FIG. 6 but with a mirror image lower half portion included. Although shown in solid lines with a fillet 102, dashed lines 104 at a leading edge area 106 indicate that a bull nose leading edge portion could just as readily be incorporated. The fillet 102 has been found to reduce the stagnation recirculation region. Optionally, adding a fillet ahead of the bullnose (indicated by dashed lines 104) can eliminate the stagnation region altogether, although at the expense of increasing the overall length of the airfoil 100 slightly (i.e., by about 10%).

Figure 18:
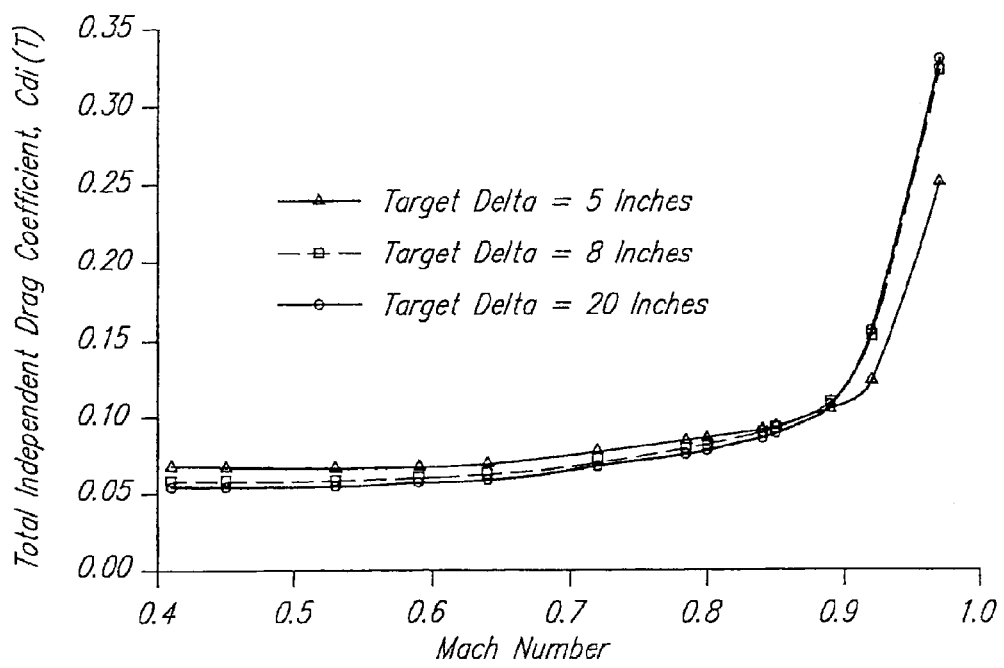
FIG. 18 is a graph of the drag rise for the airfoil of FIG. 17 at various aircraft local Mach numbers.

It was also desired to provide sufficient curvature over the center portion of the fairing 10 and the airfoil 100 to avoid any structural problems. High normal loads (normal to the fairing 10 surface) can be induced on the fairing 10 by the aircraft local flow field or failure events, e.g., decompression of the cabin air into the fairing or emergency descent under icing conditions. Curved surfaces provide additional strength to the structure allowing the use of lightweight material required for good RF performance. However, increased curvature results in higher peak Mach numbers. It is highly desirable to keep the peak Mach low enough to avoid a shock at the maximum cruise Mach speed. The shock causes flow separation, increases drag and vibration. FIG. 18 illustrates that the airfoil 100 and fairing 10 perform to maintain the drag rise (a result of shocks) above 0.9 for the aircraft local Mach number. Aircraft are required to have no perceptible buffet or vibration up to the maximum operating mach number for the aircraft. By designing the fairing 10 to avoid shocks and any significant flow separation for local mach numbers up to 0.9 (well above maximum cruise mach (0.85) for modern aircraft) the probability of perceptible buffet or vibration is eliminated. In addition for normal cruise, the absence of any significant vibration for the majority of the flight time will avoid structural fatigue damage and increase the fairing 10 and attachment hardware life limits and structural inspection intervals.

This design approach also enhances the probability that the fairing 10 will perform as well as other aircraft component, i.e, wing and tail surfaces, at the aircraft maximum design (demonstrated flight) flight speed, which can be up to mach 0.97.

Figure 19:
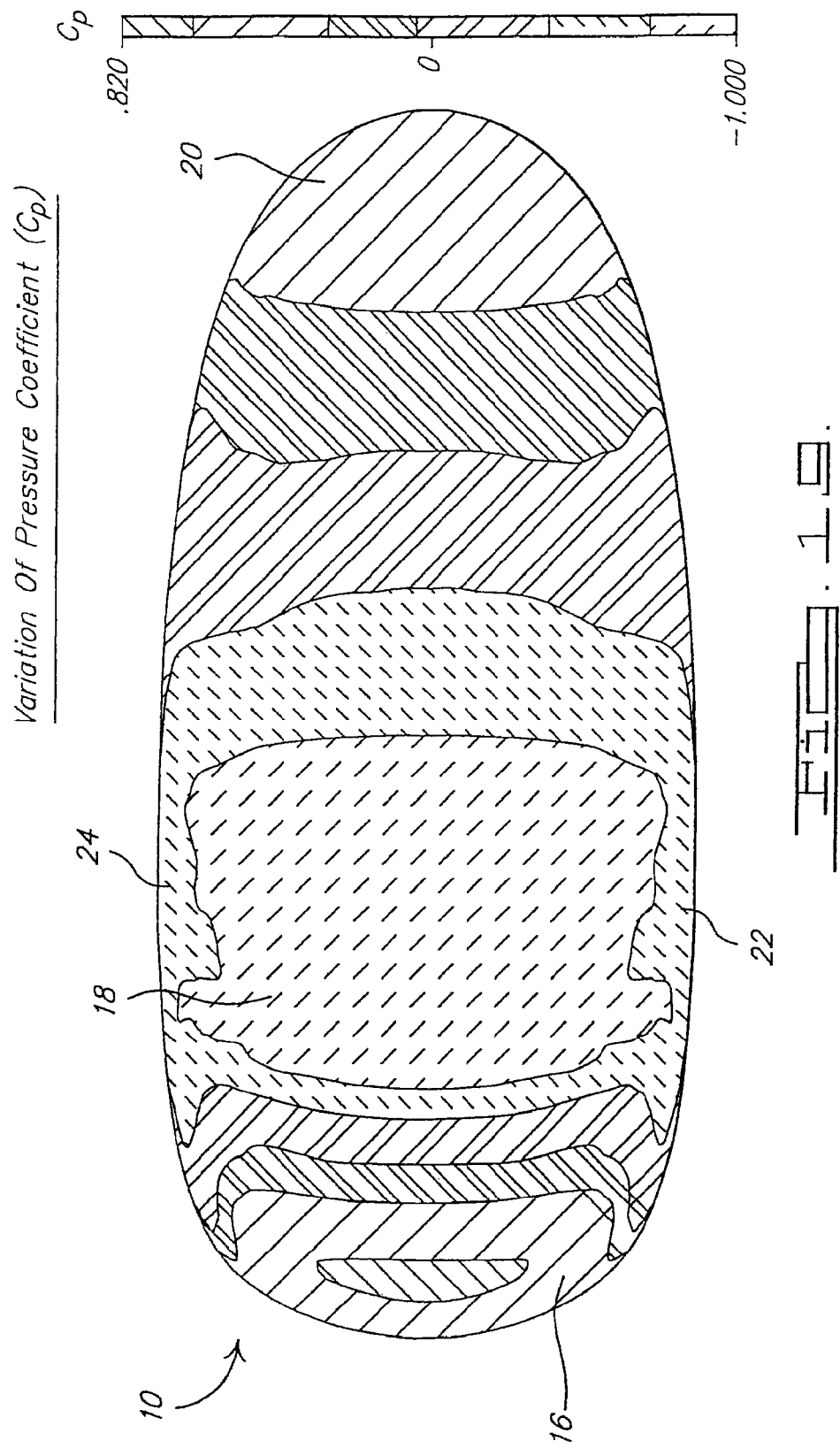
FIG. 19 is a graph of the uniform pressure load over the airfoil.

FIG. 19 illustrates the uniform pressure flow distribution over the fairing 10 from a longitudinal centerline of the fairing 10 to its outboard side portions 22 and 24. The term "Cp" indicates pressure coefficient. The Cp range is from −1 to +0.8 where Cp=(delta static pressure)/(dynamic pressure). "Dynamic pressure" can be defined as follows:

$$\text{Dynamic pressure}=0.5\times\text{density}\times\text{velocity}^2$$

where the density is the air density at the flight altitude and velocity is the velocity of the aircraft.

"Delta static pressure" is the net of the external pressure minus the internal pressure on the fairing 10. FIG. 19 highlights the uniform pressure distribution from the longitudinal centerline of the fairing 10 to the outboard edges. Using a single airfoil for the fairing 10 provides a uniform variation in pressure as you go outboard toward the side portions 22,24, and a similar profile for the pressure distribution. Thus, the pressure at the longitudinal centerline and the outboard edges (i.e., side portions 22,24) are similar. In addition, the pressure at the vent locations 30 (FIG. 4) is close to the pressures across the fairing (inboard to outboard) and the resulting internal pressure (equal to the vent pressure) will minimize the fairing loads for normal flight (i.e., the internal pressure load more closely balances the external pressure load).

The fairing 10 thus avoids low grazing angles for an antenna beam and a trailing edge surface of the fairing. The fairing 10, however, still provides sufficient clearance to mount an antenna thereunder. Sufficient curvature is also provided on a top portion of the fairing 10 to avoid structural buckling under high loads, but not so much curvature that would result in a high crown Mach number. The fairing 10 further is usable at high aircraft cruise Mach numbers (i.e., 0.85 Mach), aircraft maximum operating Mach numbers up to, or possibly exceeding, 0.92 Mach, and aircraft maximum design (demonstrated flight) mach numbers up to, or possibly exceeding, 0.97. The fairing 10 minimizes flow separation, minimizes incremental drag, and is scaleable in its thickness ratio to maintain uniform inboard to outboard pressure distribution.

The fairing 10 provides a means for enclosing a relatively large component on an exterior surface of a mobile platform, and most advantageously on a mobile platform adapted to travel at high speeds, in a manner that significantly reduces or essentially eliminates the negative aerodynamic consequences that would otherwise be created by the component. Importantly, fairing 10 utilizes an airfoil shape that maintains the peak local Mach number at various portions over the fairing 10 low to avoid shocks that could otherwise be created by local Mach numbers greater than about 1.2 in magnitude. The fairing 10 further provides very low aerodynamic drag. The fairing 10 further does not negatively impact the performance of the aircraft (or other form of mobile platform) on which it is installed, or otherwise complicate construction of the mobile platform itself. The fairing 10 is lightweight and readily adaptable and scaleable to a wide range of mobile platforms to cover a wide range of components protruding from an exterior surface of the mobile platform.

Still another advantage of the fairing 10 is the overall contours of the fairing produce very good radio frequency (RF) incidence angles. By this it is meant that when the fairing 10 is used to enclose an antenna that is transmitting information or data, the contours of the fairing 10 significantly reduce the distortion or refraction of the electromagnetic beam. by the surface of the fairing 10. These effects on the electromagnetic beam cause beam scattering and reduce the operating efficiency of the antenna or can result in failure to meet regulatory requirements.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An aerodynamic fairing secured to, an exterior surface of an airborne mobile platform for enclosing an electronic device supported on said mobile platform, the fairing being positioned on said exterior surface downstream from a nose of the mobile platform, so as to be in a boundary layer when said mobile platform is in flight, the fairing comprising:
  a top portion;
  a pair of side portions extending from said top portion to define a volume, said side portions extending substantially perpendicular to said top portion;
  a chord length designated by X;
  a chord thickness at a local center line representing a thickness designated by Z;
  wherein a ratio of Z/X lies within a range of about 11-13%;
  said fairing further having a drag coefficient that is relatively constant and less than a value of about 0.10 below an airspeed of about Mach 0.9;
  said fairing further having a peak Mach number for airflow over a longitudinal centerline of said fairing that is no greater than about 1.2 at an airspeed of said mobile platform of about Mach 0.85;
  said fairing further having a frontal portion, said frontal portion forming an angle at a half height point thereof of between about 20 degrees to about 32 degrees, and having a pressure distribution (Cp) that is positive at a trailing edge of the fairing; and
  said volume of said fairing being sufficient to fully enclose said electronic device underneath said fairing when said fairing is positioned over said electronic device and secured to said exterior surface of said mobile platform.

2. The aerodynamic fairing of claim 1, wherein said ratio comprises a ratio of about 12%.

3. The aerodynamic fairing of claim 1, wherein said frontal portion comprises a frontal area of at least approximately three square feet.

4. The aerodynamic fairing of claim 1, wherein said fairing further comprises a tapering rear portion, and wherein said top portion and said tapering rear portion have a radius of curvature of about 130 inches.

5. The aerodynamic fairing of claim 4, wherein said frontal portion and said tapering rear portions provide minimum angle with the RF scan lines of 20 degrees to be achieved by an antenna positioned underneath said fairing.

6. The aerodynamic fairing of claim 1, wherein said fairing includes upper corner portions each having a radius of curvature of about 6 inches.

7. The aerodynamic fairing of claim 1, wherein the fairing produces an aerodynamic drag of no more than about 50 pounds when said mobile platform is traveling at an airspeed of about 0.80-0.90 Mach.

8. The aerodynamic fairing of claim 7, wherein fairing generates no more than about 50 pounds of drag at about 0.85 Mach.

9. The aerodynamic fairing of claim 1, wherein said chord length comprises a length of between about 90-100 inches (228.6-254 cm).

10. The aerodynamic fairing of claim 1, wherein said chord thickness comprises a maximum height at said local centerline of about 12 inches (30.48 cm).

11. The aerodynamic fairing of claim 1, wherein said frontal portion includes a fillet along a lower edge thereof.

12. The aerodynamic fairing of claim 1, wherein said fairing includes at least a pair of vents formed on opposite sides of said local centerline for equalizing pressure on opposing surfaces of said fairing.

13. An aerodynamic fairing secured to an exterior surface of an airborne mobile platform to completely cover and enclose an antenna mounted on said exterior surface, the fairing further being positioned on said exterior surface so as to be behind a nose of the airborne mobile platform and thus within a boundary layer when said airborne mobile platform is in flight, the fairing comprising:
  a top portion;
  a pair of side portions extending from said top portion to define a volume for said fairing, said volume being sufficient to enclose said antenna therein;
  a chord length designated by X;
  a chord thickness at a local center line representing a thickness designated by Z;
  wherein a ratio of Z/X lies within a range of about 11-13%;
  said fairing further having a drag coefficient that is relatively constant and less than a value of about 0.10 below an airspeed of about Mach 0.9;
  said fairing further having a peak Mach number for airflow over a longitudinal centerline of said fairing that is no greater than about 1.2 at an airspeed of said mobile platform of about Mach 0.85;
  said fairing further having a frontal portion forming a leading edge surface for the fairing, and a tapering rear portion, said frontal portion forming an angle at a half height point thereof of between about 30 degrees to about 31 degrees, and said fairing further having pressure distribution (Cp) that is positive at said trailing edge portion;
  said top portion and said tapering rear portion forming a radius of curvature that is about 125 inches-135 inches; and
  the fairing further including at least one vent formed on one of a port side and a starboard side for equalizing pressure on inner and outer surfaces of the fairing.

14. The aerodynamic fairing of claim 13, wherein said fairing includes a fillet at a lower edge of said frontal portion.

15. The aerodynamic fairing of claim 13, wherein said chord length comprises a length between about 90-100 inches (228.6-254 cm).

16. The aerodynamic fairing of claim 13, wherein said chord thickness comprises a thickness of between about 11-13 inches (27.94-33.02 cm).

17. The aerodynamic fairing of claim 13, wherein the fairing produces no more than about 50 pounds of drag at an moving at an airspeed of about 0.85 Mach.

18. A method for aerodynamically enclosing an antenna able to be aimed at varying azimuth and elevation angles, and being mounted on an exterior surface of an airborne mobile platform at a point on said airborne mobile platform so as to be within a boundary layer while said airborne mobile platform is in flight, the method comprising:
  forming a fairing including a frontal portion, a top portion, a pair of side portions on opposite sides of the top portion, and a trailing edge portion, said frontal portion, said side portions, said top portion and said trailing edge portion defining a volume sufficient to enclose said antenna with said side portions extending substantially perpendicularly from said top portion;

forming the fairing such that;
- a chord thickness (Z) along a local centerline of the fairing, in relation to a chord length (X) of the fairing, defines a ratio of about 12%;
- a drag coefficient thereof is relatively constant and less than a value of about 0.10 below an airspeed of about Mach 0.9;
- a peak Mach number for airflow over a longitudinal centerline of said fairing that is no greater than about 1.2 at an airspeed of said mobile platform of about Mach 0.85;
- said frontal portion forms an angle such that a tangent line at a half height point thereof forms an angle of between about 30 degrees to about 31 degrees, relative to the a surface that the fairing is mounted on; and
- said top portion and said tapering rear portion form a radius of curvature of about 130 inches, such that said angle and said radius of curvature enable minimum angle with the RF scan line of about 20 degrees to be provided relative to said frontal portion and said tapering rear portion; and
- a pressure distribution (Cp) is positive at a trailing edge of the fairing.

19. The method of claim 18, further comprising venting the fairing to equalize the pressure on opposing inside and outside surfaces of the fairing.

20. The method of claim 18, further comprising forming upper side portions of the fairing between the top portion and the side portions to have a radius of curvature of about 6 inches (15.24 mm).

* * * * *